United States Patent [19]
Ota

[11] Patent Number: 5,500,763
[45] Date of Patent: Mar. 19, 1996

[54] TRANSMITTER-RECEIVER AND OPTICAL AMPLIFIER FOR OPTICAL COMMUNICATION

[75] Inventor: Takeshi Ota, Ebina, Japan

[73] Assignee: Fuji Xerox Co., Ltd., Tokyo, Japan

[21] Appl. No.: 320,264

[22] Filed: Oct. 11, 1994

[30] Foreign Application Priority Data

Nov. 5, 1993 [JP] Japan .................................. 5-276397

[51] Int. Cl.$^6$ ...................................................... H01S 3/00
[52] U.S. Cl. ............................ 359/333; 359/173; 385/14
[58] Field of Search ......................... 385/14, 45; 359/333, 359/173, 188, 195, 127, 130

[56] References Cited

U.S. PATENT DOCUMENTS

| | | | |
|---|---|---|---|
| 4,232,385 | 11/1980 | Hara et al. | 370/3 |
| 4,800,557 | 1/1989 | Weber | 370/3 |
| 4,860,294 | 8/1989 | Winzer et al. | 372/7 |
| 4,911,515 | 3/1990 | So et al. | 350/96.16 |
| 5,289,551 | 2/1994 | Nakama et al. | 385/45 |
| 5,355,237 | 10/1994 | Lang et al. | 359/130 |
| 5,365,368 | 11/1994 | Hsu et al. | 359/341 |
| 5,371,813 | 12/1994 | Artigue | 385/24 |

OTHER PUBLICATIONS

"Optical Waveguide Coupler", E. Hasegawa et al., *Shimazu Review*, vol. 47, No. 3, pp. 339–344, 1990.

"Bidirectional Fiber Amplifiers", C. W. Barnard et al., *IEEE Photon. Technol. Lett.*, vol. 4, No. 8, pp. 911–913, 1992.

"Mode Conversion in Planar–Dielectric Separating Waveguides", W. K. Burns et al., *IEEE, J. Quantum Electron.*, vol. QE–11, No. 1, pp. 23–39, 1975.

"Dielectric Branching Path Having Non–Reciprocal Characteristic", Yajima, Institute of Electronics and Communication Engineers, General National Meeting, 1978.

*Primary Examiner*—Mark Hellner
*Attorney, Agent, or Firm*—Oliff & Berridge

[57] ABSTRACT

An transmitter-receiver for optical communication which effectively prevents a received optical signal from being branched to a light emitting element side is disclosed. The transmitter-receiver for optical communication includes a transmission optical signal generation section, an optical signal reception section for receiving an optical signal by way of a communication optical fiber, and an optical signal branching and combining member for branching or combining an optical signal to be transmitted from the transmission optical signal generation section to the optical signal reception section. The optical signal branching and combining member is formed as an asymmetrically Y-shaped optical branching path member having a single waveguide mode. Also a bidirectional optical amplifier in which such optical signal branching and combining member is incorporated is disclosed.

5 Claims, 4 Drawing Sheets

TRANSMITTER-RECEIVER AND OPTICAL AMPLIFIER FOR OPTICAL COMMUNICATION

BACKGROUND OF THE INVENTION

1. Field of the Invention

This invention relates to a transmitter-receiver for an optical signal for use for optical communication and a bidirectional optical amplifier for repeating and amplifying an optical signal.

2. Description of the Related Art

A bidirectional optical communication instrument in which transmission and reception are performed by means of a single optical fiber is conventionally known and disclosed, for example, in Hasegawa et al., "Waveguide Type Optical Separator-Coupler", Shimazu Review, Vol. 47, No. 3, pp.339–344, 1990. The bidirectional optical communication instrument of the type mentioned is shown in FIG. 6.

Referring to FIG. 6, in the conventional bidirectional optical communication instrument shown, an optical signal from a light emitting element 1a of an optical transmitter-receiver 4a is combined by an optical separator-coupler 13a and is sent to another optical transmitter-receiver 4b by way of an optical fiber 5. In the optical transmitter-receiver 4b, the optical signal is separated by an optical separator-coupler 13b and sent to a light receiving element 2b. On the contrary, a light signal from the optical transmitter-receiver 4b follows the route of a light emitting element 1b, the optical separator-coupler 13b, the optical fiber 5, the optical separator-coupler 13a and a light receiving element 2a. Bidirectional optical communication is performed in this manner.

Another bidirectional optical amplifier for repeating and amplification is also known and disclosed, for example, in C. Barnard et al., "Bidirectional Fiber Amplifiers" IEEE Photon Technol Lett , Vol 4, No 8, pp.911–913, 1992. The bidirectional optical amplifier just mentioned is shown in FIG. 7.

Referring to FIG. 7, in the bidirectional optical amplifier shown, each of a pair of Er doped fiber optical amplifiers 6a and 6b is pumped by pumping light from a light source 7. The bidirectional optical amplifier further includes a pair of band-pass filters 8a and 8b for separating pumping light and signal light from each other, a pair of directional couplers 9a and 9b each having a wavelength selection performance, and another directional coupler 10. The bidirectional optical amplifier further includes a pair of optical circulators 14a and 14b for suppressing returning light to prevent oscillations of the Er doped fiber optical amplifiers 6a and 6b.

In the bidirectional optical communication instrument shown in FIG. 6, light transmitted from the optical fiber 5 to the optical transmitter-receiver 4b is separated by the optical separator-coupler 13b and diverted to the light receiving element 2b. However, since the optical separator-coupler 13b serves as an equally branching path, the light is branched not only to the light receiving element 2b but also to the light emitting element 1b. This raises the problem of a loss of the reception signal, and the loss of approximately 3 dB is caused. Further, where the light emitting element 1b is a laser diode, there is another problem in that laser oscillations of it are disturbed by the reception signal branched to the light emitting element 1b side. Such phenomenon similarly applies to an optical signal from the optical transmitter-receiver 4b.

Meanwhile, the optical circulators 14a and 14b employed in the bidirectional optical communication instrument shown in FIG. 7 which employs the amplifiers 6a and 6b make use of a magneto-optical effect and are disadvantageous in that they are expensive in cost.

SUMMARY OF THE INVENTION

It is an object of the present invention to provide a transmitter-receiver for optical communication which effectively prevents a received optical signal from being branched to a light emitting element side.

It is another object of the present invention to provide an inexpensive optical amplifier which does not employ an optical circulator.

In order to attain the objects described above, according to an aspect of the present invention, there is provided a transmitter-receiver for optical communication, which comprises an optical signal generation section for generating an optical signal to be transmitted, an optical signal reception section for receiving an optical signal, and optical signal branching and combining means for sending an optical signal from the optical signal generation section to a communication optical fiber and for sending an optical signal from the communication optical fiber to the optical signal reception section, the optical signal branching and combining means being formed as an asymmetrical Y-shaped optical branching path member which has a single waveguide mode.

With the transmitter-receiver for optical communication, a received optical signal can be prevented from branching to the light emitting element side, and consequently, attenuation of the received light can be prevented. Further, the light emitting element can be prevented from being influenced by the received light.

According to another aspect of the present invention, there is provided a bidirectional optical amplifier, which comprises first and second optical amplification means, and first and second asymmetrically Y-shaped optical branching path members each having a single waveguide mode, the first optical amplification means being connected to that one of a pair of branching optical waveguide portions of the first asymmetrical Y-shaped optical branching path member which has a lower propagation constant and to that one of a pair of branching optical waveguide portions of the second asymmetrically Y-shaped optical branching path member which has a higher propagation constant, the second optical amplification means being connected to the other branching optical waveguide portion of the second asymmetrically Y-shaped optical branching path member which has a lower propagation constant and to the other branching optical waveguide portion of the first asymmetrical Y-shaped optical branching path member which has a higher propagation constant.

With the optical amplifier, it can be produced at a reduced cost since it includes less expensive devices, that is, the asymmetrically Y-shaped optical branching path members, in place of expensive optical circulators.

Here, the asymmetric Y-shaped optical branching path member which has a single waveguide mode, say, single mode asymmetrically Y-shaped optical branching path member, may be a member wherein a pair of optical waveguide portions having different sectional shapes are branched at an equal angle with respect to an original optical waveguide or another member wherein a pair of optical waveguide portions having a same sectional shape are branched at different angles with respect to an original optical waveguide or else a further member wherein a pair of optical waveguide portions having different sectional shapes are branched at different angles with respect to an original optical waveguide.

It is known that a single mode asymmetrically Y-shaped optical branching path has a non-reciprocal characteristic, as reported in Yajima, "Dielectric Branching Path Having Non-Reciprocal Characteristic", General National Meeting in 1978 of the Institute of Electronics and Communication Engineers of Japan, 947, 1978 or in W. K. Burns et al., "Mode Conversion in Planar-Dielectric Separating Waveguides", IEEE J. Quantum Electron., Vol. QE-11, No. 1, pp.23–39, 1975.

FIGS. 5A to 5C illustrate operation of a single mode asymmetrically Y-shaped optical branching path wherein a pair of optical waveguides having an equal sectional shape branch at different angles from an original optical waveguide. In the single mode asymmetric Y-shaped optical branching path shown in FIGS. 5A to 5C, the branching path which branches at an equal angle to that of the original optical waveguide has a higher propagation constant with regard to incident light from the original optical waveguide, but the other branching path which branches at a predetermined angle with respect to the original optical waveguide has a lower propagation constant. Accordingly, in the asymmetric Y-shaped optical branching path shown in FIG. 5A, incident light to the common optical waveguide 21 is transmitted only to the optical waveguide 22 having a higher propagation constant but is not transmitted to the other optical waveguide 23 having a lower propagation constant.

On the other hand, incident light to any of the two branching optical waveguides 22 and 23 is transmitted to the common optical waveguide 21 irrespective of the propagation constants as seen in FIG. 5B or 5C.

By making use of this characteristic of the single mode asymmetric Y-shaped optical branching path, a received optical signal can be separated completely and prevented from being transmitted to the light emitting element side. Further, this characteristic can substitute for the function of an optical circulator.

Here, while the propagation constants can be controlled by way of the sectional areas, the sectional shapes or the branching angles of the individual branching paths, in order to reduce transmission to the optical waveguide 23 having a lower propagation constant substantially to zero (less than −20 dB), that is, to eliminate the reception loss, the normalization propagation constants ($\beta/K_0$) of them should be individually set, for example, to approximately 1.55 and 1.53, where $\beta$ is a propagation constant of a waveguide and $K_0$ is a wave number.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
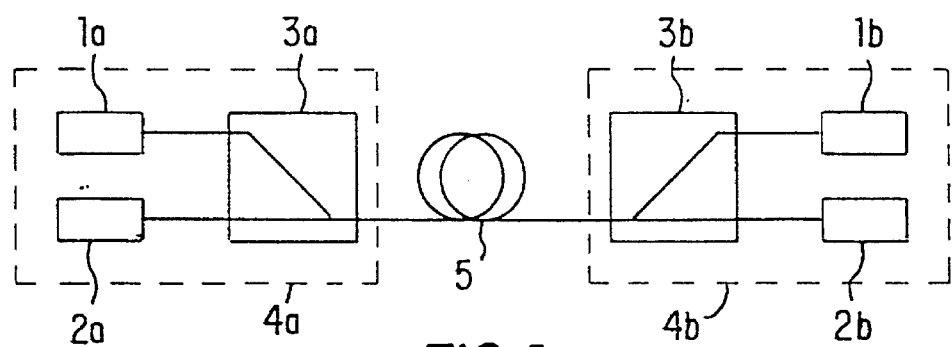
FIG. 1 is a schematic diagrammatic view of a bidirectional optical communication instrument in which a transmitter-receiver for optical communication to which the present invention is applied is incorporated.
Figure 6:
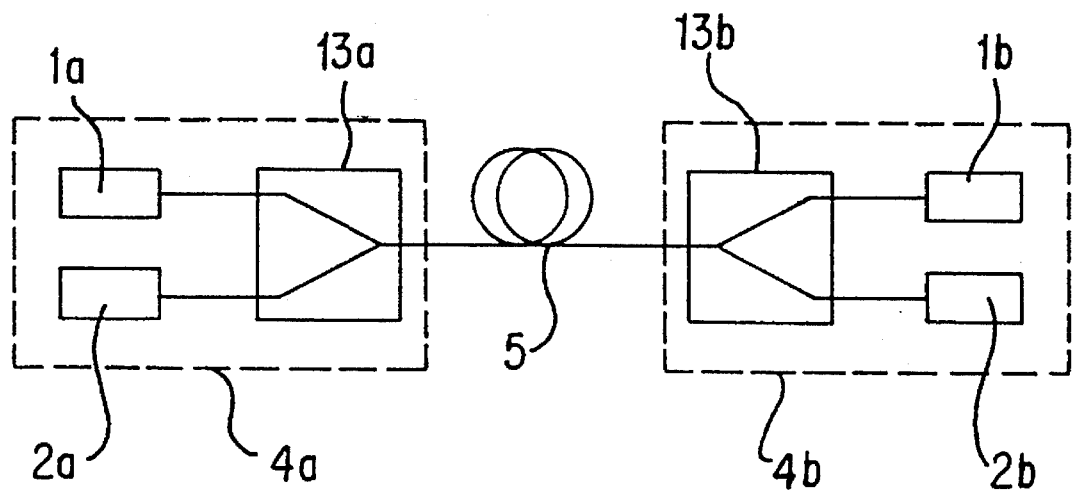
FIG. 6 is a schematic view of a conventional bidirectional optical communication instrument in which a bidirectional optical transmitter-receiver is employed.

Referring first to FIG. 1, there is shown a bidirectional optical communication instrument in which a transmitter-receiver for optical communication to which the present invention is applied is incorporated. The bidirectional optical communication instrument is similar to the conventional bidirectional optical communication instrument described hereinabove with reference to FIG. 6 in that it includes a pair of transmitter-receivers 4a and 4b for optical communication interconnected by way of an optical fiber 5. However, the bidirectional optical communication instrument is different from the conventional bidirectional optical communication instrument in that the transmitter-receivers 4a and 4b for optical communication according to the present invention include a pair of single mode asymmetric Y-shaped optical branching path members 3a and 3b in place of the optical couplers 13a and 13b, respectively.

Figure 2:
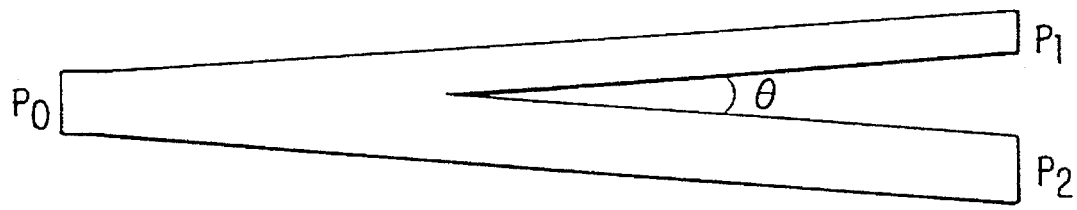
FIG. 2 is an enlarged schematic view of a single mode asymmetrically Y-shaped optical branching path member employed in the transmitter-receiver for optical communication shown in FIG. 1.

Referring now to FIG. 2, each of the single mode asymmetrically Y-shaped optical branching path members 3a and 3b is constituted from a common portion $P_0$, and a pair of waveguide portions $P_1$ and $P_2$ branching in a Y-shape from the common portion $P_0$. The optical waveguide portion $P_2$ extends along a same line as the optical path of the common portion $P_0$. Further, the optical waveguide portion $P_2$ has a larger waveguide cross sectional area than the optical waveguide portion $P_1$ and has a normalization propagation constant ($\beta/K_0$) of 1.56 while the optical waveguide portion $P_1$ connected to the light emitting element 1a or 1b has another normalization propagation constant of 1.53.

Due to the construction, an optical signal introduced into the common portion $P_0$ is transmitted most to the optical waveguide portion $P_2$ side but little propagates to the optical waveguide portion $P_1$ connected to the light emitting element 1a or 1b. Consequently, an otherwise possible reception loss of an optical signal can be eliminated. Further, since no light signal is allowed to propagate to the light receiving element 1a or 1b side, even where a laser diode is employed for the light emitting element 1a or 1b, otherwise possible disturbance to laser oscillations of the light emitting element 1a or 1b is eliminated.

It is to be noted that each of the single mode asymmetrically Y-shaped optical branching path members 3a and 3b need not necessarily be constituted from such a member wherein a pair of optical waveguide portions having different sectional shapes are branched at different angles with respect to an original optical waveguide as described above, but may be some other member wherein a pair of optical waveguide portions having different sectional shapes are branched at an equal angle with respect to an original optical waveguide or a pair of optical waveguide portions having a same sectional shape are branched at different angles with respect to an original optical waveguide.

Figure 3:
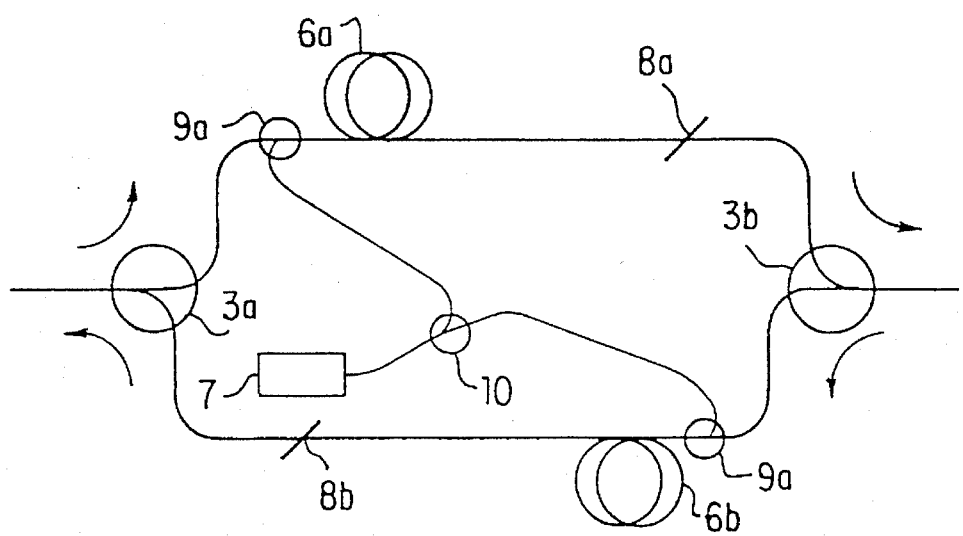
FIG. 3 is a schematic view of an amplifier for optical communication to which the present invention is applied.
Figure 7:
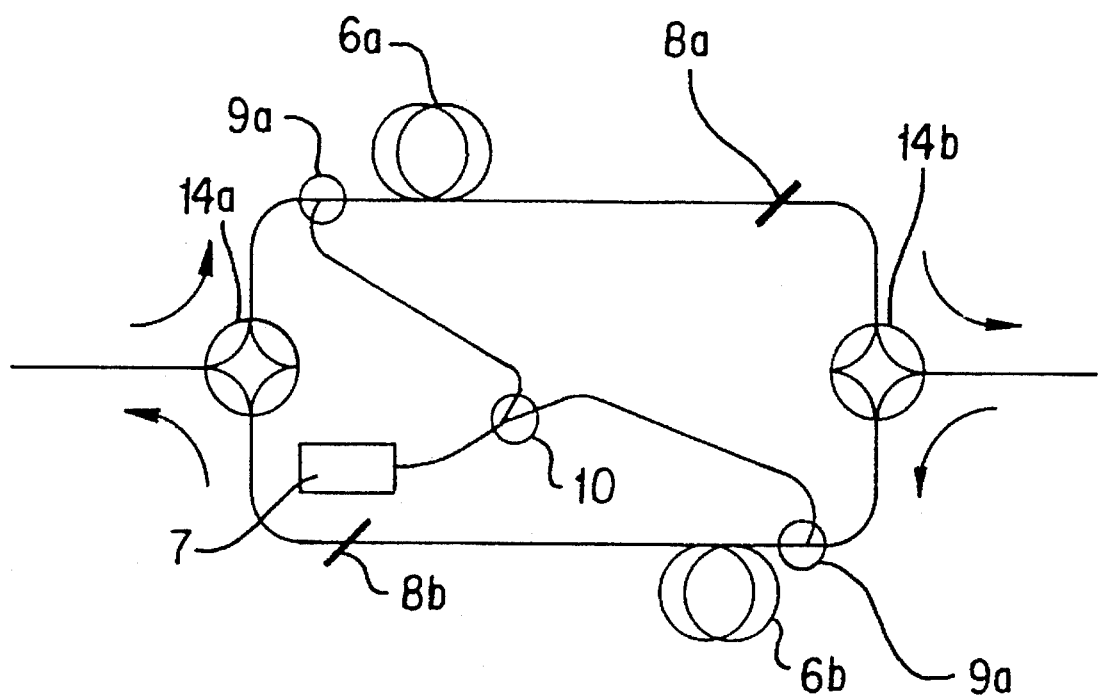
FIG. 7 is a schematic view of a conventional bidirectional optical amplifier.

FIG. 3 schematically shows an optical amplifier to which the present invention is applied. The optical amplifier shown is basically similar in construction to but is different from the conventional amplifier described hereinabove with reference to FIG. 7 in that it employs a pair of such single mode asymmetrically Y-shaped optical branching path members 3a and 3b as described above in place of the optical circulators 14a and 14b.

The single mode asymmetric Y-shaped optical branching path members 3a and 3b can suppress returning light due to their non-reciprocal characteristic to prevent oscillations of the Er doped fiber optical amplifiers 6a and 6b and hence can substitute for the function of the optical circulators. Further, according to the present construction, it is easy to form the Er doped fiber amplifiers 6a and 6b into optical waveguides to integrate them on a common circuit board together with the single mode asymmetrically Y-shaped optical branching path members 3a and 3b. In contrast, the conventional optical circulators cannot be integrated readily in process together with Er doped glass optical waveguides since they are formed on a single crystal substrate having a magneto-optical effect.

It is to be noted that, while the Er doped fiber amplifiers 6a and 6b are employed as optical amplification means in the present embodiment, the optical amplification means is not limited to them, and a semiconductor laser amplifier or a like amplifier may be employed instead.

Figure 4:
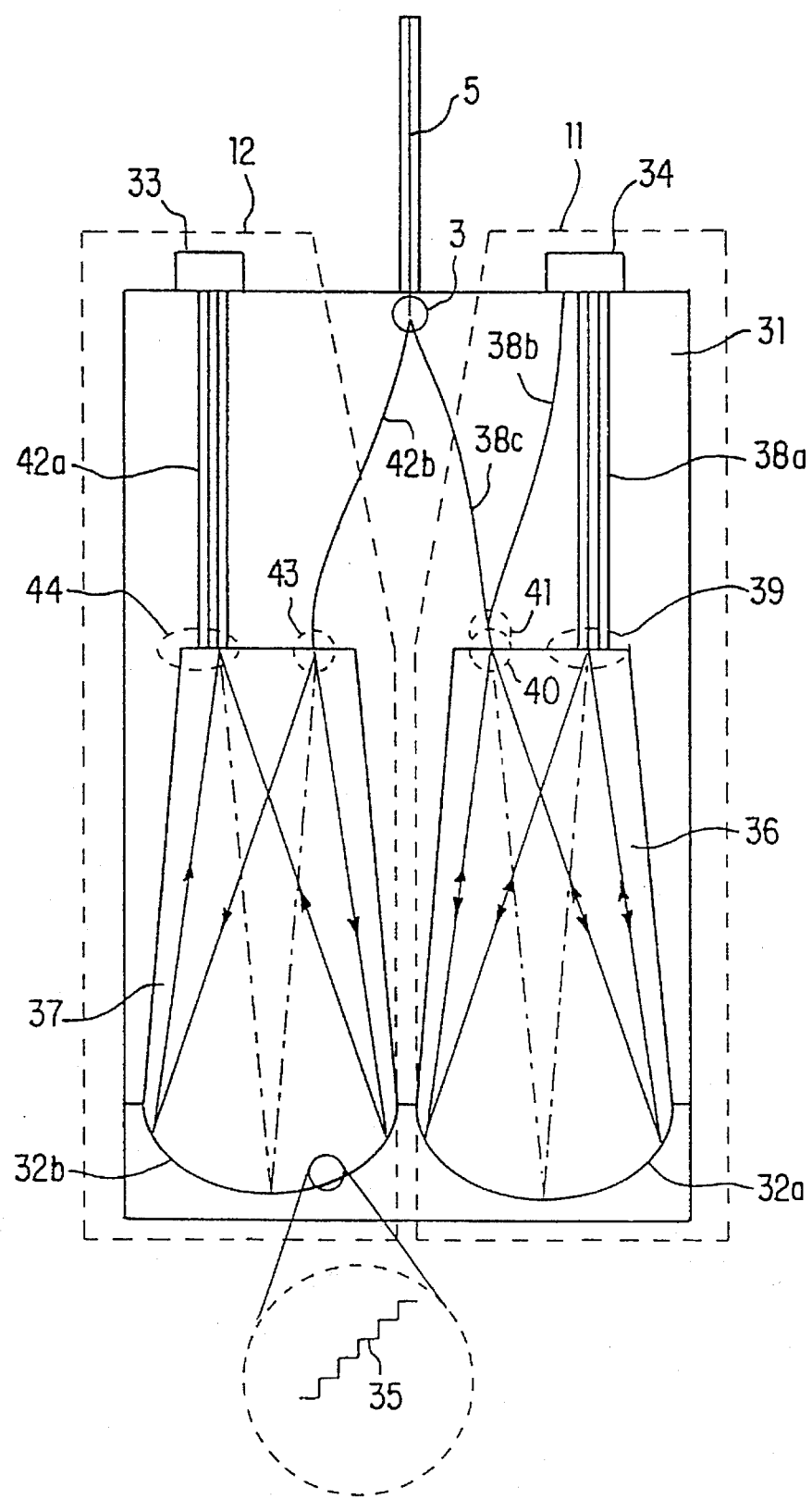
FIG. 4 is a schematic view of another transmitter-receiver for optical communication to which the present invention is applied.
Figure 5A:
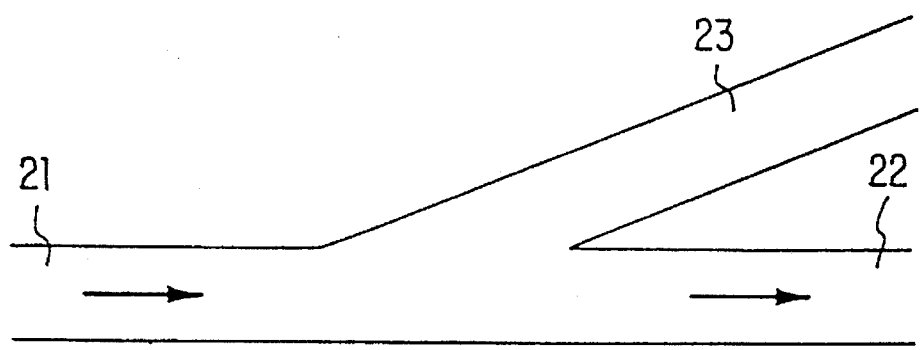
FIGS. 5A to 5C are schematic views illustrating operation of the single mode asymmetrically Y-shaped optical branching path member shown in FIG. 2.
Figure 5B:
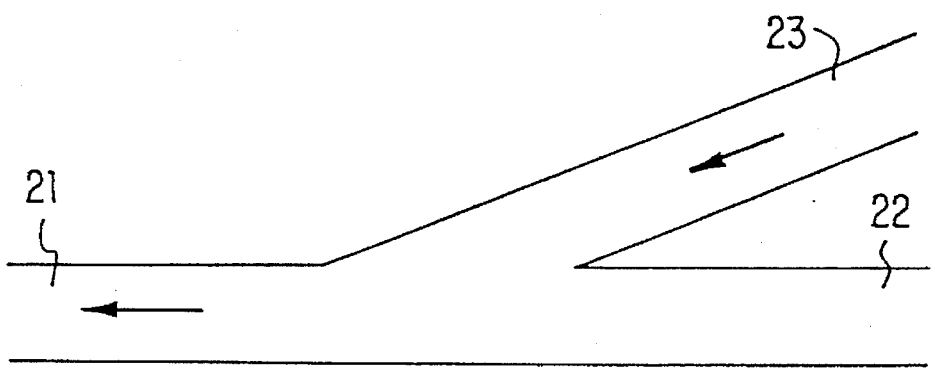
Figure 5C:
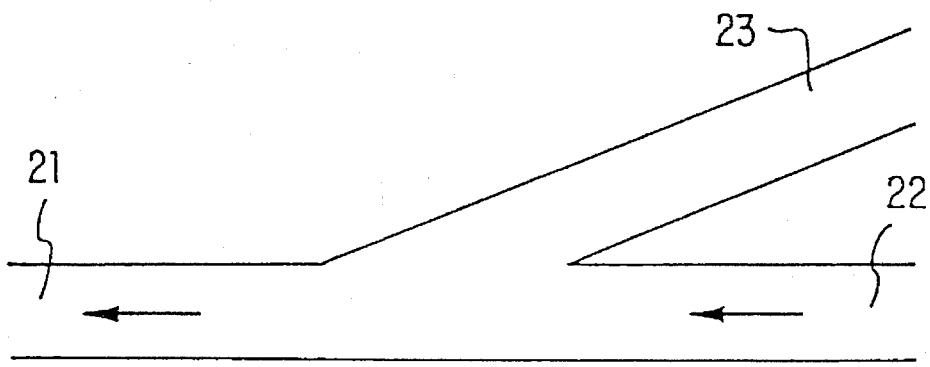

FIG. 4 shows another optical transmitter-receiver to which the present invention is applied. The optical transmitter-receiver here is a wavelength multiplexing bidirectional transmitter-receiver for optical communication. It is to be noted that the wavelength multiplexing bidirectional transmitter-receiver for optical communication is disclosed in Japanese Patent Application No. Hei 4-233892 filed by the assignee of the present patent application.

Referring to FIG. 4, the wavelength multiplexing bidirectional transmitter-receiver for optical communication shown includes a wavelength multiplexing oscillation section 11 and a wavelength multiplexing light receiving section 12, and in the wavelength multiplexing bidirectional transmitter-receiver for optical communication, the wavelength multiplexing oscillation section 11 is connected to that one of a pair of branching optical waveguide portions of a single mode asymmetrically Y-shaped optical branching path member 3 described hereinabove with reference to FIG. 2 which has a lower propagation constant.

The wavelength multiplexing bidirectional transmitter-receiver for optical communication shown in FIG. 4 further includes an integrated circuit board 31 on which optical waveguides are integrated, a pair of concave face diffraction gratings 32a and 32b disposed at end portions of the integrated circuit board 31, a photodiode array 33 as an optical receiver array and a semiconductor laser array 34 disposed at the other end portions of the integrated circuit board 31, and an optical fiber 5 for inputting and outputting an optical signal therethrough. The concave face diffraction gratings 32a and 32b are constructed each by etching the integrated circuit board 31 of glass by dry etching to form a serrated diffraction grating 35 into a concave face shape. The concave face diffraction gratings 32a and 32b are formed so that they correspond to a first slab waveguide 36 and a second slab waveguide 37, respectively. A first slab waveguide type wavelength multiplexer is constituted from the first slab waveguide 36 and the concave face diffraction grating 32a, and a second slab waveguide type wavelength multiplexer is constituted from the second slab waveguide 37 and the concave face diffraction grating 32b.

The semiconductor laser array 34 is disposed adjacent the first slab waveguide 36 at the end portion of the integrated circuit board 31. The number of semiconductor laser elements of the semiconductor laser array 34 is equal to the number of wavelengths to be multiplexed plus 1. The semiconductor laser array 34 has a non-reflective coating layer applied to an end face thereof and is mounted such that the face thereof on which the non-reflective coating layer is applied is directed to the integrated circuit board 31.

The first slab waveguide 36 and the semiconductor laser array 34 which has the non-reflective coating layer applied to the end face thereof are connected to each other by way of wiring optical waveguides 38a and 38b. A polychromator is formed from the first slab waveguide 36 and the diffraction grating 32a. The optical waveguides 38a are connected to the first slab waveguide 36, and a polychromator outputting portion 39 is constructed at the connection portion.

A substantially symmetrical location of an upper side of the first slab waveguide 36 to the polychromator outputting portion 39 serves as a common outputting portion 40. The common outputting portion 40 is connected to a first optical coupler 41, and one of a pair of branches of the optical coupler 41 is connected to the semiconductor laser array 34 by way of the wiring optical waveguide 38b while the other branch is connected to the second optical coupler 3 by way of a wiring optical waveguide 38c. A common terminal of the optical coupler 3 is connected to the optical fiber 5.

The wavelength multiplexing oscillation section 11 is formed from the semiconductor laser array 34, the first slab waveguide 36 and the concave face diffraction grating 32, and consequently, wavelength multiplexed laser light can be generated from the wavelength multiplexing oscillation section 11. Laser light oscillated with a multiplexing wavelength is outputted from the common outputting portion 40, and the laser light from the common outputting portion 40 of the slab waveguide 36 is branched by the first optical coupler 41 so that a part of the optical output is outputted to the optical fiber 5 by way of the second optical coupler 3.

The second slab waveguide 37 and the photodiode array 33 are also connected to each other by way of wiring optical waveguides 42a. A polychromator is formed by the second slab waveguide 37 and the diffraction grating 32b. A number of photodiodes (not shown) which corresponds to the number of wavelengths are arranged on the photodiode array 33. A common inputting portion 43 of the second slab waveguide 37 and the second optical coupler 3 are connected to each other by way of a wiring optical waveguide 42b. The wiring optical waveguides 42a are connected to a polychromator outputting portion 44 of the second slab waveguide 37.

An optical signal arriving from the outside by way of the optical fiber 5 is branched by the second optical coupler 3, which functions as a single mode asymmetric Y-shaped optical branching path member, and is introduced into the second slab waveguide 37 by way of the wiring optical waveguide 38c and past the common inputting portion 43. The optical signal is then spectralized to form an image by the concave face diffraction grating 32b, and then passes the different wiring optical waveguides for the individual wavelengths so that it is converted into electric signals for the individual wavelengths by the photodiodes (not shown) of the photodiode array 33.

In this instance, another signal transmitted from the outside by way of the optical fiber 5 is almost sent into the wavelength multiplexing light receiving section 12 by way of the single mode asymmetric Y-shaped branching path member 3. On the other hand, an optical signal from the wavelength multiplexing oscillation section 11 is transmitted to the outside past the single mode asymmetric Y-shaped branching path member 3 by way of the optical fiber 5.

Consequently, a received optical signal can be effectively prevented from being branched to the wavelength multiplexing oscillation section 11.

Having now fully described the invention, it will be apparent to one of ordinary skill in the art that many changes and modifications can be made thereto without departing from the spirit and scope of the invention as set forth herein.

What is claimed is:

1. A transmitter-receiver for optical communication, comprising:

an optical signal generation section for generating an optical signal to be transmitted;

an optical signal reception section for receiving an optical signal; and optical signal branching and combining means for sending an optical signal from said optical signal generation section to a communication optical fiber and for sending an optical signal from said communication optical fiber to said optical signal reception section;

said optical signal branching and combining means being formed as an asymmetrically Y-shaped optical branching path member which has a single waveguide mode.

2. A transmitter-receiver for optical communication according to claim 1, wherein said optical signal generation section is connected to that one of a pair of branching optical waveguide portions of said asymmetrically Y-shaped optical branching path member which has a lower propagation constant for a wavelength of the optical signal.

3. A transmitter-receiver for optical communication according to claim 1, wherein said optical signal generation section is constructed as wavelength multiplexing oscillation means and said optical signal reception section is formed as wavelength multiplexing reception section.

4. a transmitter-receiver for optical communication according to claim 1, wherein said optical signal generation section includes a semiconductor laser array, a slab waveguide optically coupled to said semiconductor laser array, and a diffraction grating interposed in said slab waveguide, and said optical signal reception section includes a photodiode array, a slab waveguide optically coupled to said photodiode array, and a diffraction grating interposed in said slab waveguide of said optical signal reception section.

5. A bidirectional optical amplifier, comprising:

first and second optical amplification means; and first and second asymmetrically Y-shaped optical branching path members each having a single waveguide mode;

said first optical amplification means being connected to that one of a pair of branching optical waveguide portions of said first asymmetrically Y-shaped optical branching path member which has a lower propagation constant and to that one of a pair of branching optical waveguide portions of said second asymmetrically Y-shaped optical branching path member which has a higher propagation constant;

said second optical amplification means being connected to the other branching optical waveguide portion of said second asymmetrically Y-shaped optical branching path member which has a lower propagation constant and to the other branching optical waveguide portion of said first asymmetrically Y-shaped optical branching path member which has a higher propagation constant.

* * * * *